(12) United States Patent
Thomas et al.

(10) Patent No.: US 6,598,519 B1
(45) Date of Patent: Jul. 29, 2003

(54) PARTICULATE DISTRIBUTOR

(75) Inventors: Tony L. Thomas, Worthington, OH (US); William W. Wharton, Lancaster, OH (US)

(73) Assignee: J. E. Grote Company, Inc., Columbus, OH (US)

(*) Notice: Subject to any disclaimer, the term of this patent is extended or adjusted under 35 U.S.C. 154(b) by 0 days.

(21) Appl. No.: 10/182,989

(22) PCT Filed: Feb. 9, 2001

(86) PCT No.: PCT/US01/04179
§ 371 (c)(1),
(2), (4) Date: Oct. 24, 2002

(87) PCT Pub. No.: WO01/58278
PCT Pub. Date: Aug. 16, 2001

Related U.S. Application Data
(60) Provisional application No. 60/181,891, filed on Feb. 11, 2000.

(51) Int. Cl.[7] .............................. A23L 1/00; B02C 19/00
(52) U.S. Cl. ....................... 99/494; 99/450.1; 99/450.7; 118/16; 118/24; 118/25
(58) Field of Search .................... 99/494, 516, 534, 99/452–455, 450.1, 450.2, 450.6, 450.7; 118/16, 20, 31, 24, 30, 677; 426/289, 496, 549, 653

(56) References Cited

U.S. PATENT DOCUMENTS

| | | | | |
|---|---|---|---|---|
| 3,779,205 A | * | 12/1973 | Kuhlman | 118/24 |
| 3,780,643 A | * | 12/1973 | Papai | 99/450.7 |
| 4,044,714 A | * | 8/1977 | Jones et al. | 118/24 |
| 4,112,834 A | * | 9/1978 | Thiry | 99/450.1 |
| 4,145,990 A | * | 3/1979 | Hochandel et al. | 118/25 X |
| 5,109,760 A | * | 5/1992 | Ansari | 99/494 |
| 5,523,101 A | * | 6/1996 | Fitch, Jr. | 99/494 X |

* cited by examiner

*Primary Examiner*—Timothy F. Simone
(74) *Attorney, Agent, or Firm*—Jason H. Foster; Kremblas, Foster, Phillips & Pollick

(57) ABSTRACT

A particulate, such as grated cheese, distributor for breaking up and distibuting clumps of cheese over a defined surface of a tiltable conveyor (30, 31). The distributor includes a housing (10, 11) with a throat axle (22, 23), with a plurality of radial paddles (21), is positioned at the lower end of the throat to strike and break up the clumps of cheese in the charge and distribute the cheese over a wide area. The cheese particles follow trajectories that include a plurality of downwardly extending stationary rods (44, 45) spaced radially outwardly of the axle, and a shroud (42, 43) spaced radially outwardly of the stationary rods.

13 Claims, 7 Drawing Sheets

PARTICULATE DISTRIBUTOR

This application claims the benefit of U.S. Provisional Application No. 60/181,891, filed Feb. 11, 2000.

BACKGROUND OF THE INVENTION

1. Field of the Invention

The invention relates generally to particulate distribution, and more specifically to an apparatus that distributes food particulate, such as grated or shredded cheese, IQF (Instantaneously Quick Frozen) vegetables, or meats, over a discrete region of a moving substrate, such as the central portion of an upper surface of a pizza crust.

2. Description of the Related Art

Pizza crusts and other food substrates, such as breads, meats and food trays, often must be coated with cheese or other particulate. In conventional food processing facilities, such substrates are conveyed rapidly beneath one or more machines that form and apply toppings to the crusts.

In order to coat a substrate, such as a pizza crust, with particulate, such as cheese, the cheese is conventionally cascaded onto the moving crusts as the crusts pass beneath the coating machine. However, a significant amount of cheese falls between circular crusts and is lost or must be recirculated, which is undesirable. Furthermore, the cheese covers at least some of the crust edges, which is sometimes undesirable. Furthermore, most cascade-type coating devices apply different amounts of cheese to different crusts, creating inconsistencies, which are undesirable.

Still further, grated and shredded cheeses can agglomerate to form clumps that cannot easily flow onto crusts. Clumps form when cheese is frozen, or when the particles simply cohere to one another due to the normal physical characteristics of cheese.

Therefore, the need exists for a mechanism that distributes cheese, and other particulate, to crusts, or other moving, discrete substrates. The desired mechanism must distribute a measured amount evenly over a predetermined portion of the surface of every substrate without any appreciable clumping.

SUMMARY OF THE INVENTION

The invention is an apparatus for breaking up agglomerated particulate and distributing it. The particulate that is contemplated for use with the present invention includes grated and shredded cheese, but could include other food particulate. The particulate is distributed onto a discrete portion of a moving substrate, such as a pizza crust that is being conveyed along a conveyor belt.

The apparatus includes an axle rotatably mounted to a machine frame. The axle has four paddles mounted to it, and each paddle is mounted at one paddle end to a spaced point around the circumference of the axle. Each paddle extends transversely from the axle for distributing particulate about the axle when the axle is rotating and particulate falls onto the paddles.

A housing is mounted to the machine frame at least partially above the axle. The housing has a throat into which particulate can be poured, such as from a weighing unit, for directing particulate toward the axle.

A plurality of stationary rods is connected to the machine frame. The stationary rods are disposed radially outwardly of the axle and are substantially parallel to one another and preferably to the axle's axis of rotation. Particulate distributed by the axle's paddles impinges upon the stationary rods and falls downwardly.

A shroud is connected to the machine frame radially outwardly of the stationary rods. The shroud extends from an upper edge to a lower edge and has an inner surface for limiting the trajectory of particulate.

A vertically adjustable conveyor has a longitudinally displaceable upper surface positioned beneath the lower edge of the shroud. The conveyor is for receiving particulate and conveying it onto a substrate, such as the pizza crust, moving beneath the vertically adjustable conveyor.

A measured amount of cheese is fed into the throat and against the rotating axle. The paddles on the rotating axle strike and throw the particulate radially, including against the stationary rods, the shroud, and the conveyor. The particulate is distributed evenly over the surface of the conveyor as limited, ultimately, by the shroud. The conveyor tilts down away from the shroud's lower edge and conveys the particulate onto the moving substrate beneath the conveyor.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DESCRIPTION OF THE PREFERRED EMBODIMENT

Figure 1A:
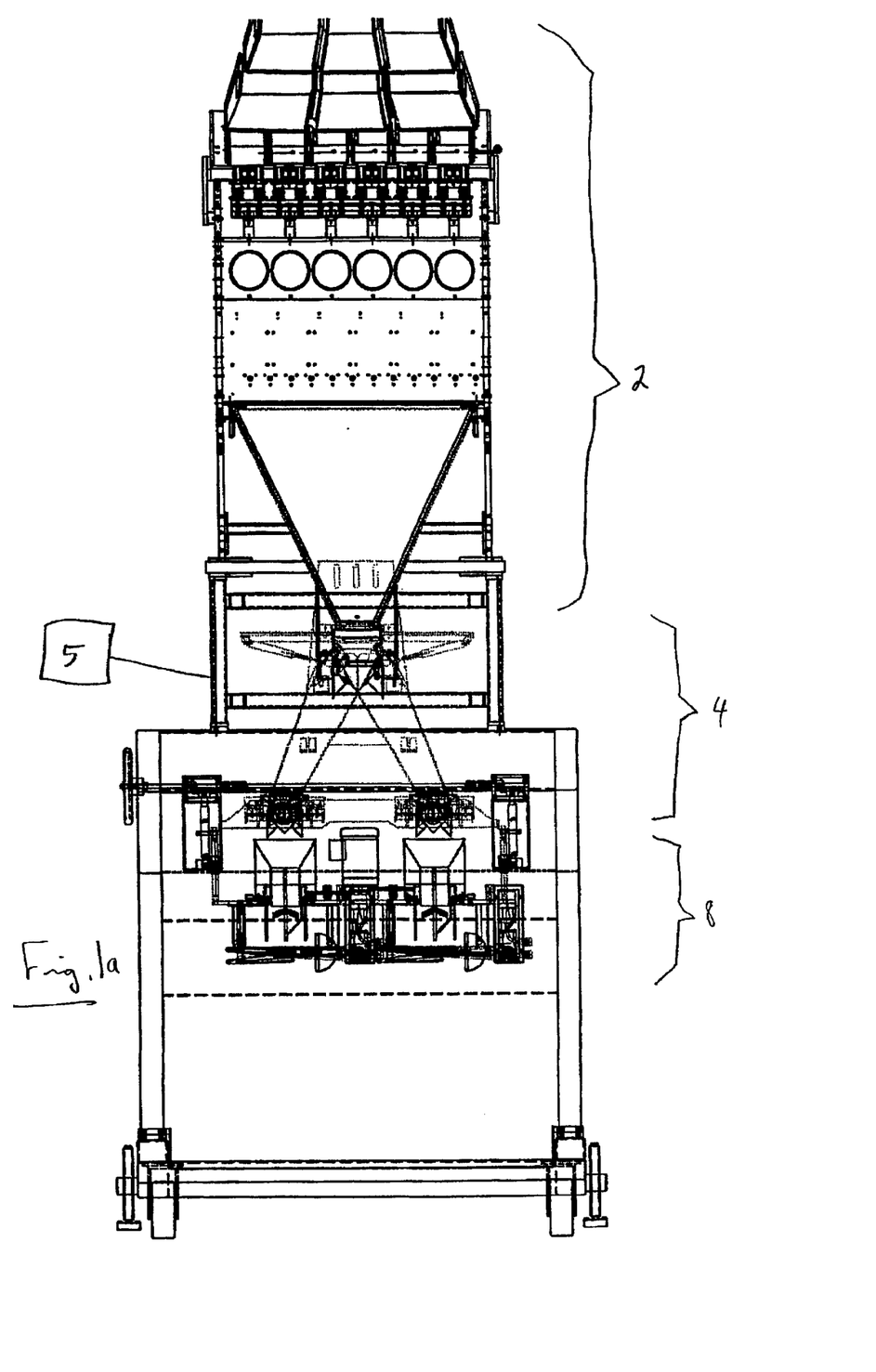
FIG. 1(a) is a side view illustrating the preferred position of the present invention in relation to the cooperating parts of the preferred embodiment.
Figure 1B:
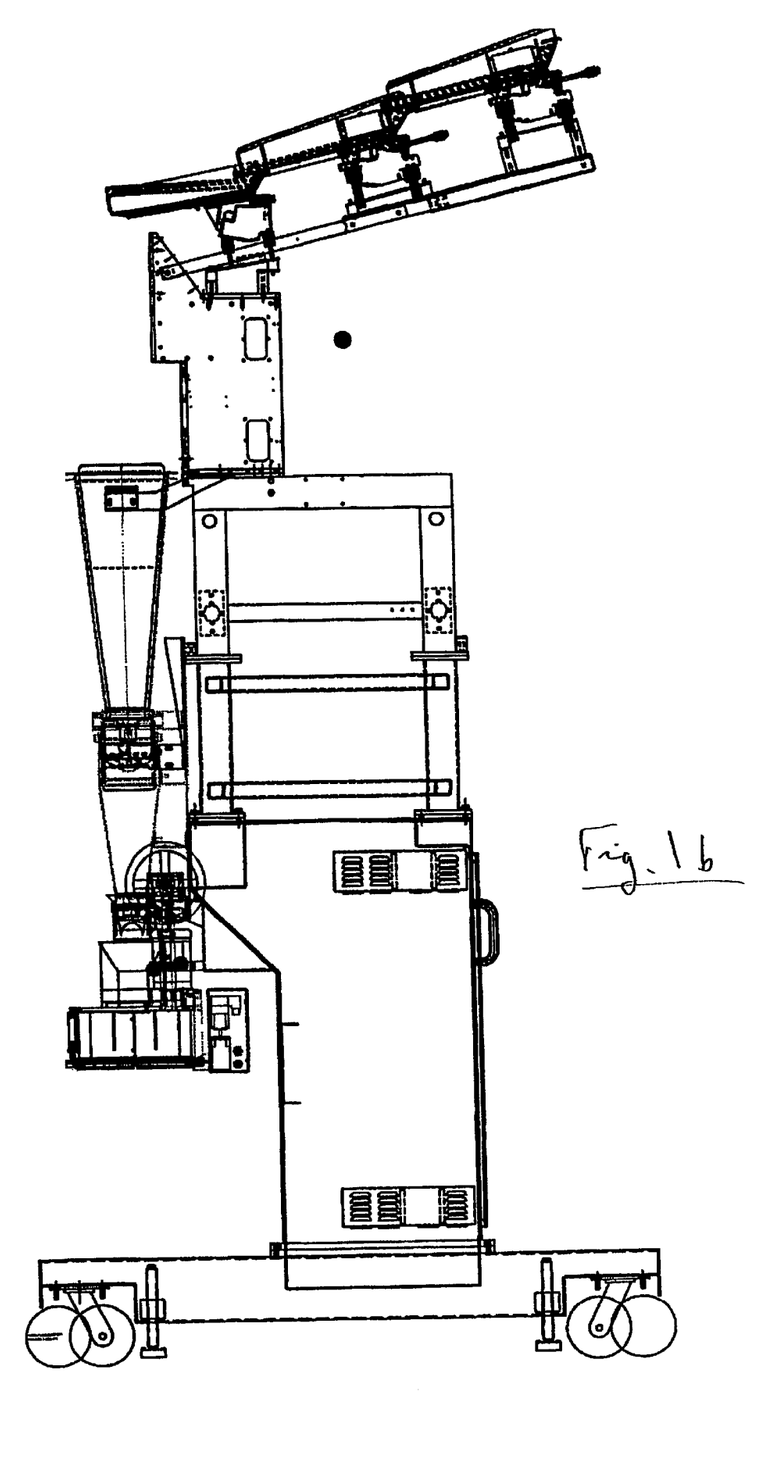
FIG. 1(b) is an end view illustrating the preferred position of the present invention in relation to the cooperating parts of the preferred embodiment.

The overall view of the machine in which the invention is included is shown in FIG. 1. The weighing unit 2 of the machine is a conventional weighing unit purchased for the purpose of weighing out discrete charges of particulate and subsequently conveying the charges to the directing unit 4 of the invention. One kind of suitable weighing unit is purchased from the Triangle Package Machinery Company under the model name "Selectacom Computer Weigher".

The directing unit 4 directs the charges of particulate weighed by the weighing unit 2 into one of two buckets 6 and 7. The buckets 6 and 7 hold the charge of particulate until it is time to drop the charge into the particulate distributor 8 awaiting beneath the buckets. The weighing unit 2, directing unit 4, buckets 6 and 7 and other parts of the machine are all connected to a central computer 5. The buckets 6 and 7 are both shown in their open position in FIG. 2.

Figure 2:
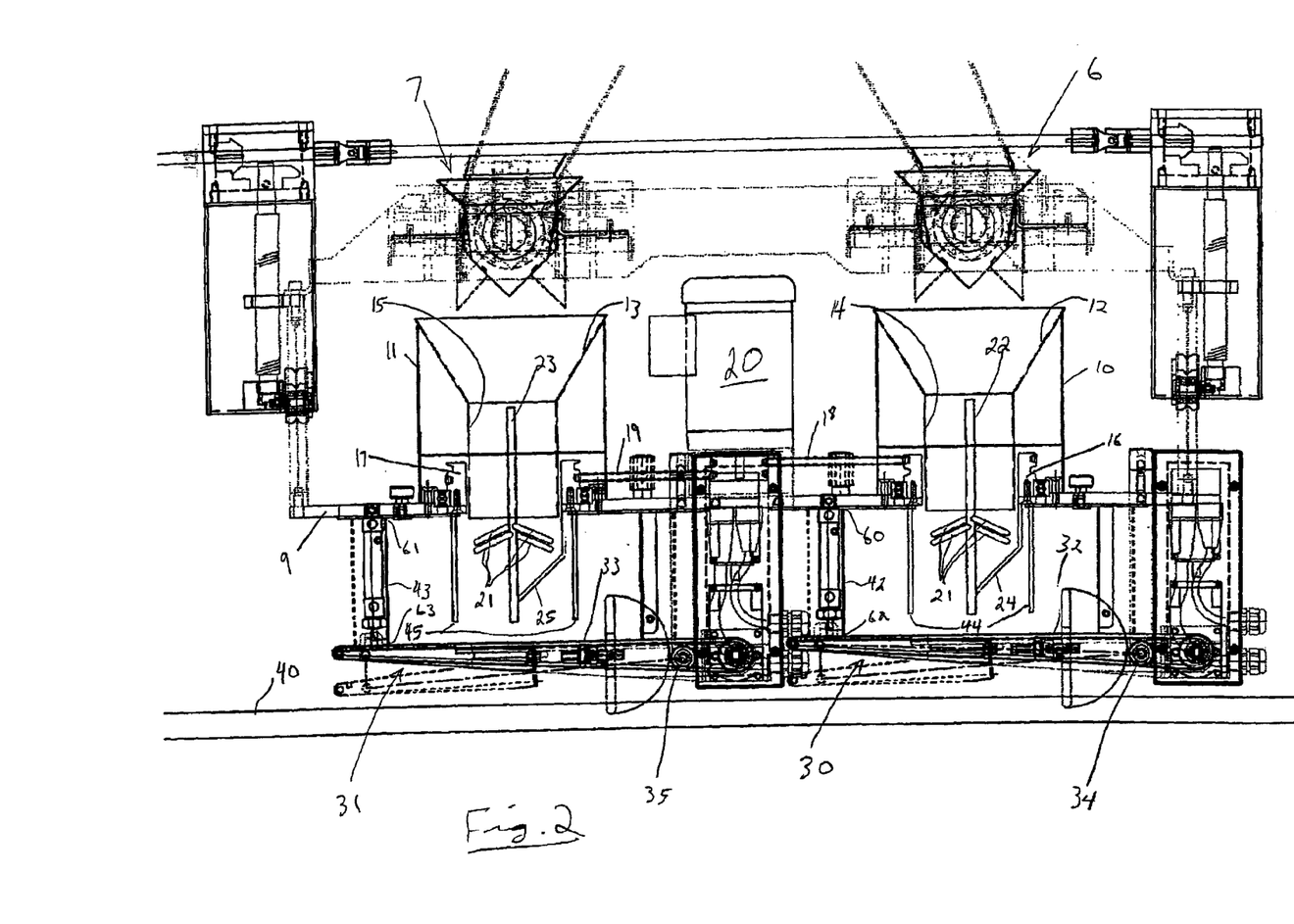
FIG. 2 is a side view illustrating the preferred embodiment of the present invention.

Referring to FIG. 2, the buckets 6 and 7 are shown positioned directly above a pair of housings 10 and 11, respectively. The housings have inner, funnel-shaped mouths 12 and 13 that direct the particulate dropped from the buckets downwardly through the throats 14 and 15. The housings 10 and 11 are mounted to the machine frame 9.

The housings are mounted adjacent to pulleys 16 and 17 that encircle the throats 14 and 15 and are drivingly linked by belts 18 and 19 to a prime mover, preferably the electric motor 20. Axles 22 and 23 are drivingly linked to the pulleys 16 and 17 by drive bars 24 and 25, respectively. As the motor 20 rotates to drive the pulleys, the pulleys and drive bars drive the axles in rotating motion about the axles' axes.

Preferably four paddles 21 are mounted about the outer circumferential surfaces of the axles 22 and 23. Of course, there could be a different number of paddles. The paddles 21 are mounted at an inner paddle end to the axles, and extend radially outwardly therefrom transverse to the axle. The paddles 21 preferably appear perpendicular to the axles when viewed from the tops of the axles (see FIG. 3), and appear angled downward slightly when viewed from the side. The radially outward ends of the paddles 21 are preferably disposed radially inward of the inner wall surfaces of the throats of the housings.

Vertically adjustable, and preferably tiltable, conveyors 30 and 31 are positioned beneath the axles 22 and 23. The conveyors 30 and 31 have belts 32 and 33, respectively, that are driven in a conventional manner about pulleys disposed at opposite conveyor ends. The conveyors 30 and 31 are cantilevered and can be tilted about axes 34 and 35, respectively, by pneumatic actuators (not shown) to lower the free ends (the left ends in FIG. 2), toward the substrate conveyor 40.

Figure 3:
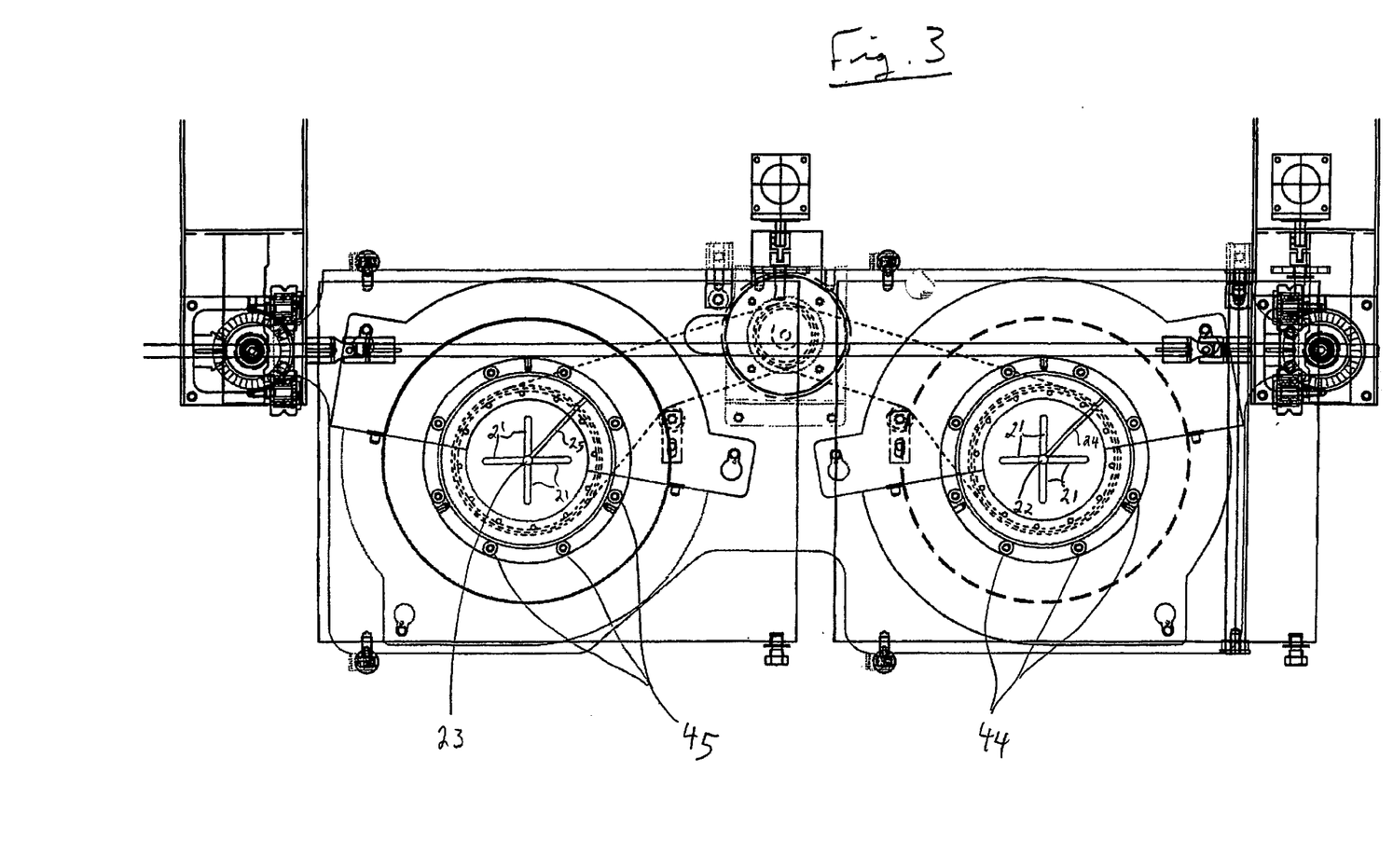
FIG. 3 is a top view illustrating the embodiment of FIG. 2.

A plurality of stationary rods 44 and 45 are mounted to the machine frame 9 and extend downwardly therefrom toward the conveyors as shown in FIGS. 2 and 3. The stationary rods are positioned equiangularly around the axles 22 and 23 at about every 45 degrees.

The shrouds 42 and 43 are preferably removably connected to the frame 9. The shrouds are preferably circular cylindrical panels that encircle, and are spaced radially outwardly from, the axles and the stationary rods. The shrouds 42 and 43 have upper edges 60 and 61 mounted near and preferably against the lower surface of the machine frame 9, and lower edges 62 and 63 mounted near, and preferably in very close proximity to, the upper surface of the conveyors 30 and 31, respectively. The shrouds limit the particulate thrown by the paddles 21 from being distributed outside of the predetermined regions of the conveyors 30 and 31 as defined by the lower shroud edges 62 and 63.

Referring to FIGS. 1 through 3, particulate, for example grated or shredded cheese, is moved by the weighing unit 2 downwardly in discrete, measured charges to the directing unit 4. The directing unit directs the charge alternatingly between buckets 6 and 7. Each bucket is actuated to drop its charge into the mouth of the corresponding housing 10 or 11 when signaled by the central computers. The paddles 21 mounted to the rotating axles strike the cheese at high speed after the cheese passes through the throats 14 and 15, thereby breaking up the cheese and projecting the cheese particles at high speed in a radial direction toward the shrouds 42 and 43. Of course, many cheese particles fall beneath the paddles and never reach the shrouds.

As other cheese particles follow trajectories toward the shrouds 42 and 43, many of them impinge upon the stationary rods 44 and 45. This impingement changes the trajectories of the particles, causing many of the particles to fall down toward various areas of the conveyors' upper surfaces. Any particles that continue past the stationary rods strike the inner surfaces of the shrouds and fall down to the conveyors' surfaces. The cheese particles are thereby distributed evenly over the surfaces of the conveyors 30 and 31.

The result of the breaking up and rapid distribution of the particulate charge is the even coating of the upper surface of the conveyors 30 and 31 with a cheese layer having outer edges defined by the lower edges 62 and 63 of the shrouds. The shapes of the inner surfaces of the shrouds limit the region onto which the cheese will be distributed, because the cheese particles cannot be projected beyond the shroud. The shrouds are preferably circular cylinders but can be rectangular cylinders or other shapes.

Once cheese is spread over the predetermined surfaces of the conveyors 30 and 31, the conveyors can be tilted downward to form a gap beneath the lower shroud edge and then advanced forward to spread the cheese over a moving substrate, such as a pizza crust, on the primary conveyor 40. The conveyors 30 and 31 convey the cheese at the same speed that the crusts on the primary conveyor 40 are moving, thereby coating the crusts with a layer of cheese of the predetermined shape and size at the precise time they pass beneath the conveyors 30 and 31. That predetermined shape and size can be the shape and size of the crust or some other shape and size, such as just slightly smaller than the crust to leave a border around the crust edges without cheese.

It is preferred that a photoelectric cell, video camera, motion detector, or other detecting device (not shown) sense the leading edge of a crust at the time that it reaches a predetermined point. This detecting device then sends a signal to the central computer 5, which also controls or detects the speed of the primary conveyor 40. The central computer 5 also maintains data about which of the conveyors 30 and 31 last coated a crust, and it actuates the other conveyor to tilt downward and convey its cheese onto the detected crust. While this occurs, the first conveyor is being coated with cheese in preparation for the next detected crust. It is preferred that a pair of cheese coating mechanisms be used in tandem aligned along the path of crust movement, with each mechanism coating every other crust.

The speed the axles 22 and 23 are rotated can be varied according to the food particulate and the diameters of the shrouds. The diameters of the shrouds can also be changed simply by replacing the shroud with another shroud. This is easily accomplished because the shrouds and stationary rods are designed to be easily removed for cleaning. It is contemplated that the axles and housings could also be made to be easily removable. Additionally, the positions, number, and sizes of the stationary rods can also be changed.

Figure 4:
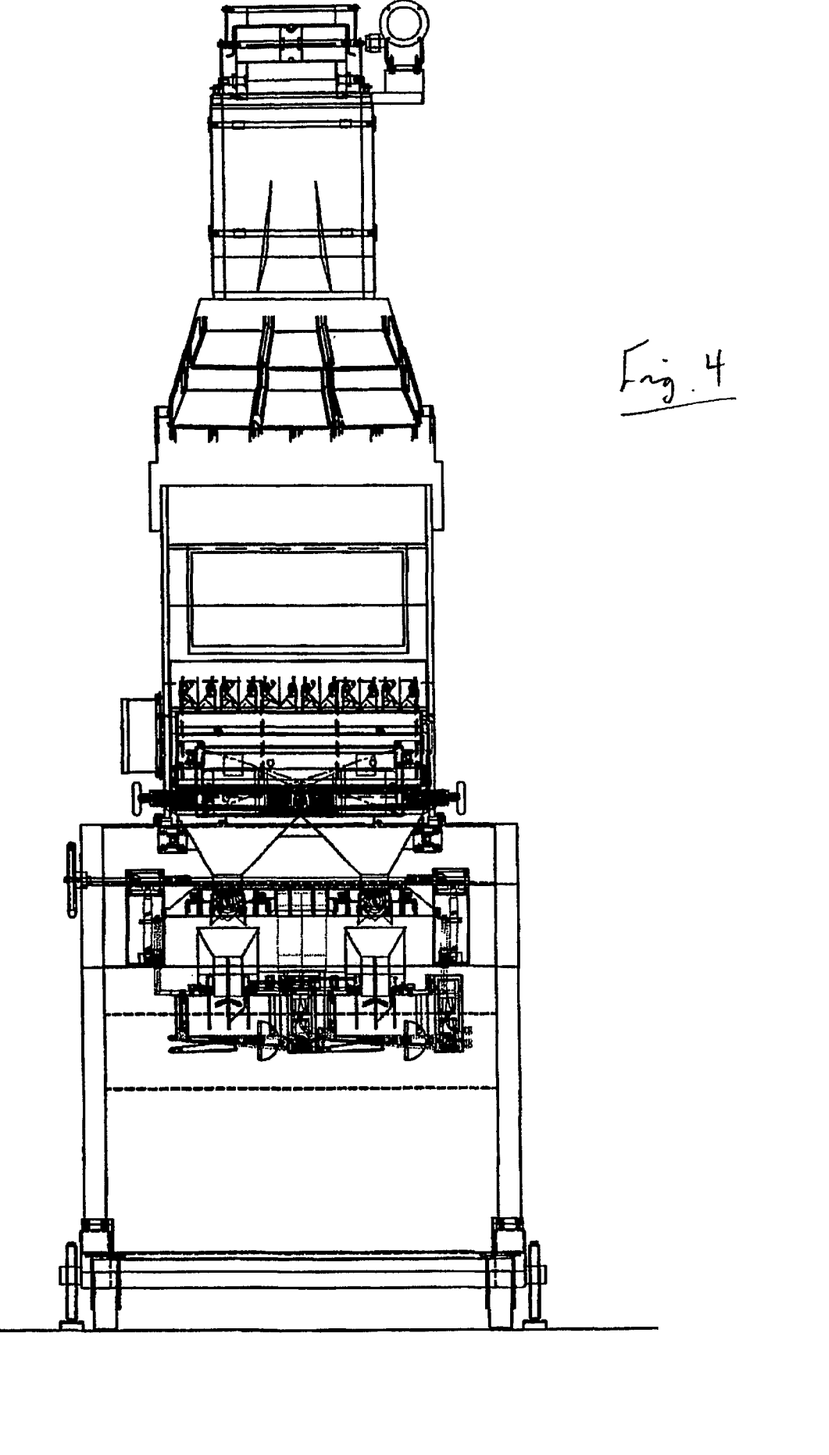
FIG. 4 is a side view illustrating an alternative directing unit.
Figure 5:
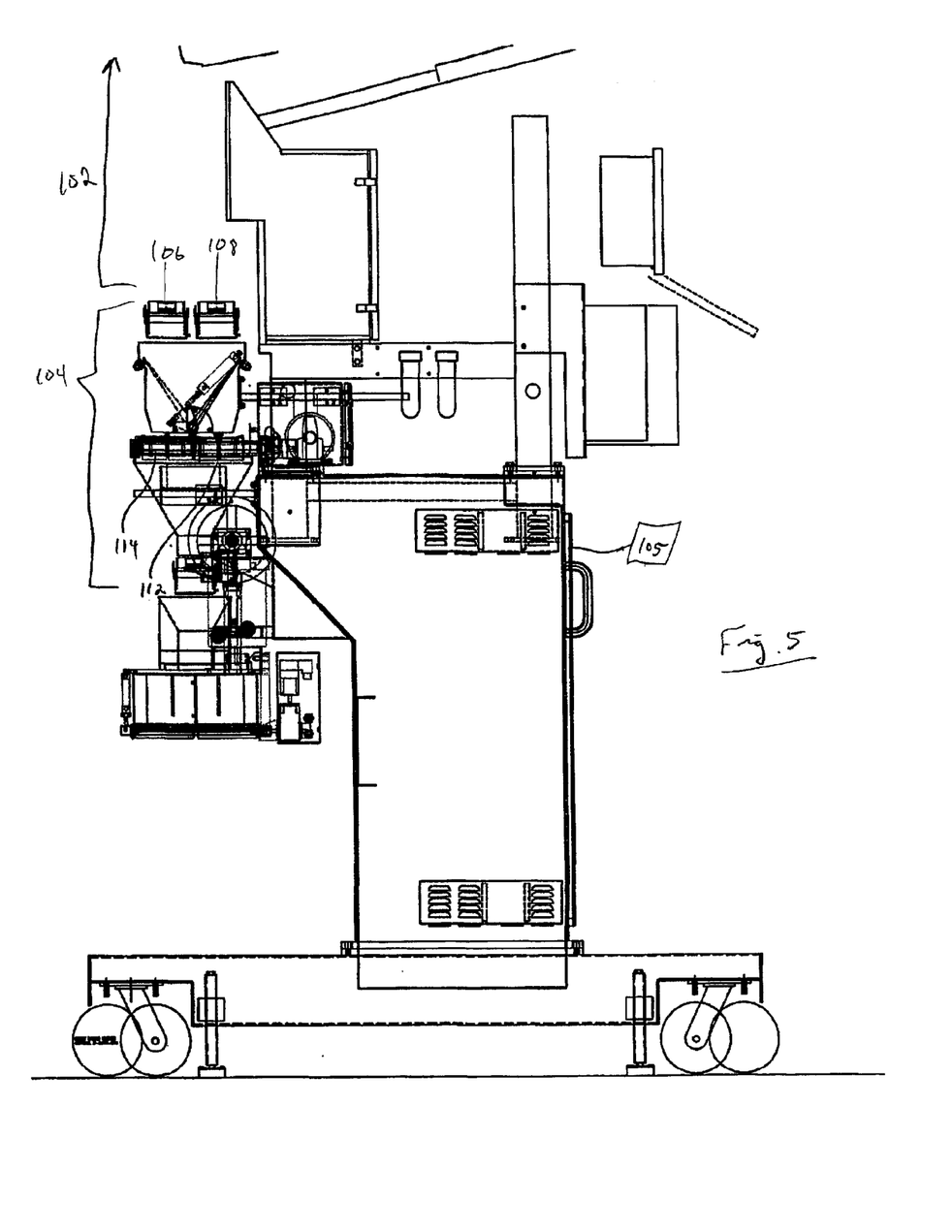
FIG. 5 is an end view illustrating the alternative directing unit.
Figure 6:
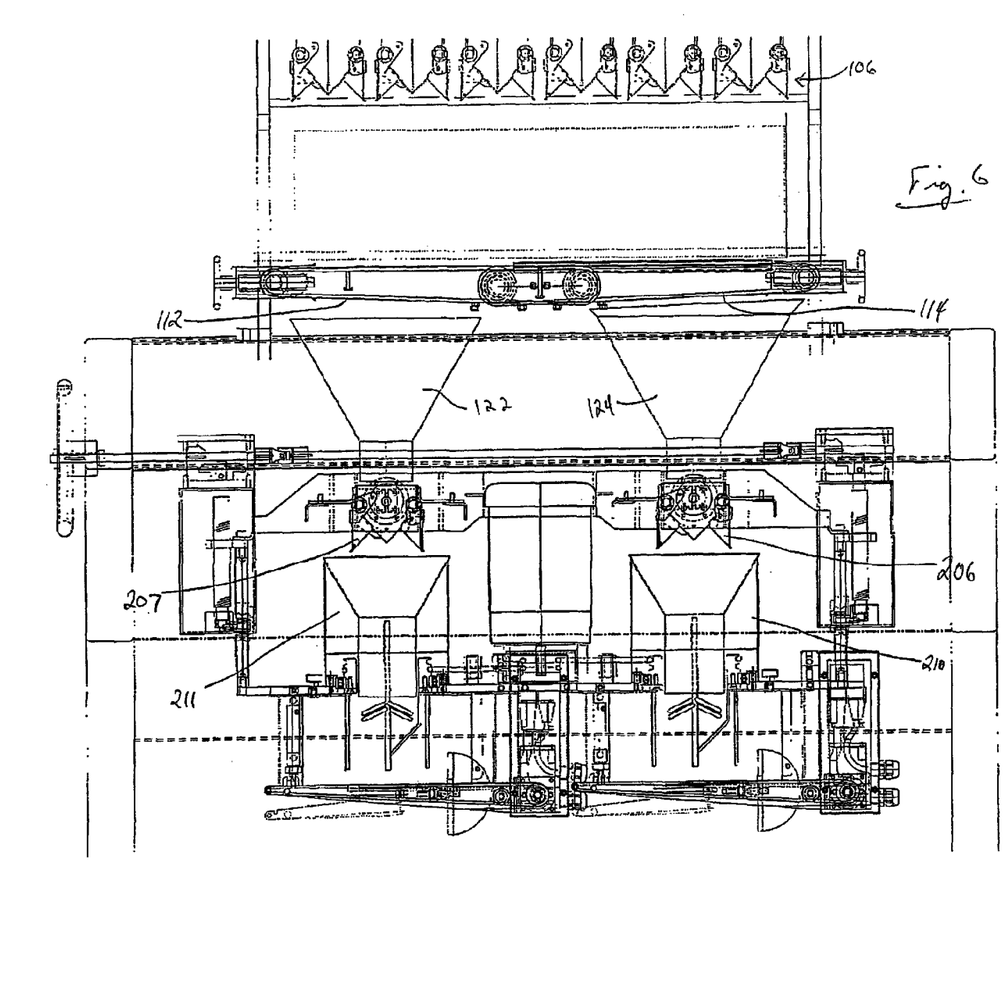
FIG. 6 is a magnified front view illustrating the alternative directing unit.

An alternative to the directing unit 4 shown in FIG. 1 is the directing unit 104 shown in FIGS. 4, 5 and 6. The alternative directing unit has a lower profile, thereby decreasing the overall height of the machine. The directing unit 104 includes a pair of bucket rows 106 and 108, as shown in FIG. 5. The buckets in the distal (outboard) bucket row 106 are shown in FIGS. 4 and 6, and the buckets in the proximal (inboard) bucket row 108 are hidden therebehind in those drawings.

The weighing unit 102 is substantially the same as the weighing unit 2 shown in FIG. 1: it weighs out charges of particulate, such as grated or shredded cheese, and dispenses them into the buckets in the bucket rows. Each bucket in the bucket rows can hold and, upon signaling by the central computer 105, release a charge of cheese.

A diverter panel 110, shown in FIG. 5, is hinged between two extreme positions about a pivot at its lower edge, preferably by a pneumatic cylinder (not shown). When the diverter panel is at the distal position shown in FIG. 5, charges of cheese dropped from any bucket in the distal bucket row 106 fall onto the diverter panel and are guided downward along its sloped surface toward the proximal diverter conveyor 112. Alternatively, when the diverter panel is at the proximal position shown in phantom in FIG. 5, charges of cheese dropped from any bucket in the proximal bucket row 108 are guided downward toward the distal diverter conveyor 114. This crossover from a distal bucket toward the proximal conveyor allows the cheese charge to fall controllably from the buckets as it slides along the surface of the diverter panel.

Referring to FIG. 6, the diverter conveyors 112 and 114 are shown above first and second funnels 122 and 124, respectively. The proximal conveyor 112, which is parallel to and behind the distal conveyor 114 as shown in FIG. 5, conveys a charge of cheese dropped from any of the leftward four buckets in the distal bucket row 106 down the diverter panel and into the funnel 124. Charges of cheese from either of the rightward two buckets in the distal bucket row 106 slide down the diverter panel directly into the funnel 124.

The distal conveyor 114 conveys a charge of cheese dropped from any of the rightward four buckets in the proximal bucket row 108 down the diverter panel into the funnel 122. Charges of cheese from either of the leftward two buckets in the proximal bucket row 108 slide down the diverter panel directly into the funnel 122.

Once cheese is conveyed into one of the funnels, it drops into the buckets 206 and 207, shown in FIG. 6. The buckets 206 and 207 are similar to the buckets 6 and 7 shown in the preferred embodiment. The buckets 206 and 207 retain a charge of cheese until signaled by the central computer 5 to release the charge into the corresponding housing 210 and 211.

While certain preferred embodiments of the present invention have been disclosed in detail, it is to be understood that various modifications may be adopted without departing from the spirit of the invention or scope of the following claims.

We claim:

1. An apparatus for breaking up agglomerated particulate and distributing it on a discrete portion of a substrate moving beneath the particulate, the apparatus comprising:
   (a) a housing mounted to a machine frame, said housing having a throat for guiding particulate poured therein;
   (b) an axle rotatably mounted near, and aligned with, the housing throat, said axle having radially extending paddles mounted thereto, each paddle mounted to the periphery of the axle at a radially inwardly facing paddle end and extending transversely from the axle for striking and distributing particulate that passes through the throat;
   (c) a plurality of stationary rods disposed radially outwardly of the axle forming an obstruction to particulate distributed by the paddles; and
   (d) a shroud having an inner shroud surface disposed radially outwardly of the stationary rods, said shroud extending from an upper shroud edge to a lower shroud edge for limiting the trajectory of particulate distributed by the paddles to the inner shroud surface.

2. The apparatus in accordance with claim 1, further comprising a vertically displaceable conveyor having a longitudinally displaceable upper surface positioned beneath the lower shroud edge for receiving distributed particulate and conveying it onto the moving substrate beneath the vertically adjustable conveyor.

3. The apparatus in accordance with claim 2, wherein the vertically displaceable conveyor is mounted in the manner of a cantilever having a pivotable end and an opposite, free end, said free end being tiltably displaceable vertically with respect to said lower shroud edge and said moving substrate, for creating a space there between through which particulate on said longitudinally displaceable upper surface can be conveyed.

4. The apparatus in accordance with claim 3, further comprising a sensor mounted to detect the position of said moving substrate, said sensor connected to a central computer and said vertically displaceable conveyor for signaling the central computer to displace said conveyor vertically downwardly when the moving substrate is detected.

5. The apparatus in accordance with claim 1, wherein said stationary rods extend substantially vertically downwardly from said machine frame and are substantially parallel to one another and said axle.

6. The apparatus in accordance with claim 5, wherein said stationary rods are equiangularly spaced around said axle at substantially every 45 degrees.

7. The apparatus in accordance with claim 6, wherein said throat is a circular cylinder having an inner throat surface spaced radially outwardly of said axle a predetermined distance and said stationary rods are disposed in a gap formed between the inner throat surface and the inner shroud surface, and wherein said stationary rods are closer to said inner throat surface than said inner shroud surface.

8. The apparatus in accordance with claim 1, wherein said housing has a funnel-shaped mouth at an upper end of the throat, for directing particulate into the throat.

9. The apparatus in accordance with claim 1, wherein each of said paddles has a radially outwardly facing paddle end opposite to said radially inwardly facing paddle end, and said throat is a circular cylinder having an inner surface spaced radially outwardly of said axle a distance substantially equal to the distance the radially outwardly facing paddle ends are spaced from said axle.

10. The apparatus in accordance with claim 1, further comprising a cone mounted substantially coaxially to said axle, wherein a wider cone end is closer to the throat than an opposite, narrower cone end.

11. The apparatus in accordance with claim 1, further comprising a drive bar mounted to said axle and extending radially outwardly to a drive wheel encircling said axle rod.

12. The apparatus in accordance with claim 1, further comprising a second apparatus aligned along the direction of movement of the substrate as the first apparatus, said second apparatus being substantially identical to the first apparatus, and being connected to a central computer that, based upon the detection of the moving substrate, actuates the first apparatus and the second apparatus alternatively to distribute particulate on the moving substrate.

13. An apparatus for breaking up agglomerated particulate and distributing it on a discrete portion of a substrate moving beneath the particulate, the apparatus comprising:
   (a) a housing mounted to a machine frame, said housing having a throat for guiding particulate poured therein;
   (b) an axle rotatably mounted near, and aligned with, the housing throat, said axle having radially extending paddles mounted thereto, each paddle mounted to the periphery of the axle at a radially inwardly facing paddle end and extending transversely from the axle for striking and distributing particulate poured through the throat;

(c) a plurality of substantially parallel stationary rods connected to the machine frame and disposed radially outwardly of the axle forming an obstruction to particulate distributed by the paddles;

(d) a shroud having an inner shroud surface disposed radially outwardly of the stationary rods, said shroud extending from an upper shroud edge to a lower shroud edge for limiting the trajectory of particulate distributed by the paddles to the inner shroud surface; and (e) a vertically adjustable conveyor having a longitudinally displaceable upper substrate surface positioned beneath the lower shroud edge, said conveyer being mounted in the manner of a cantilever having a pivotable end and an opposite, free end, said free end being tiltably displaceable vertically with respect to said lower shroud edge and said moving substrate, for receiving distributed particulate on the upper substrate surface, creating a space through which particulate on said upper substrate surface can be conveyed, and conveying it onto the moving substrate beneath the vertically adjustable conveyor.

\* \* \* \* \*